United States Patent [19]

Goel

[11] Patent Number: 4,626,575

[45] Date of Patent: Dec. 2, 1986

[54] PRESSURE SENSITIVE ADHESIVES

[75] Inventor: Anil B. Goel, Worthington, Ohio

[73] Assignee: Ashland Oil, Inc., Ashland, Ky.

[21] Appl. No.: 725,599

[22] Filed: Apr. 22, 1985

[51] Int. Cl.$^4$ .................................................. C08F 8/30
[52] U.S. Cl. ........................... 525/329.5; 525/329.6;
525/329.9; 525/375
[58] Field of Search ................. 525/375, 329.5, 329.6,
525/329.9

[56] References Cited

U.S. PATENT DOCUMENTS

| | | | |
|---|---|---|---|
| 3,884,852 | 3/1975 | Sheppard | 525/166 |
| 4,056,502 | 11/1977 | Gross | 525/329.9 |
| 4,137,385 | 1/1979 | Reitz et al. | 525/327.6 |
| 4,297,449 | 10/1981 | Goto et al. | 525/327.6 |
| 4,504,620 | 3/1985 | Cluff et al. | 525/437 |
| 4,508,869 | 4/1985 | Keskey et al. | 525/279 |

*Primary Examiner*—Joseph L. Schofer
*Assistant Examiner*—Bernard Lipman
*Attorney, Agent, or Firm*—H. M. Hanegan

[57] ABSTRACT

Curing of a pressure-sensitive adhesive resin based on an acrylic interpolymer containing pendant carboxylic acid or anhydride groups is effected through reaction with a 2-oxazoline cross-linking agent. The polyfunctional 2-oxazoline are particularly useful for this purpose and provide resins of substantially improved cohesive strength.

6 Claims, No Drawings

PRESSURE SENSITIVE ADHESIVES

BACKGROUND OF THE INVENTION

1. Field of the Invention

This invention relates to the use of 2-oxazoline cross-linking agents for effecting the ambient temperature curing of a reactive vinyl addition polymer. More particularly, the invention relates to the use of said cross-linking agents for preparing pressure-sensitive adhesive films from an acrylic interpolymer.

2. Description of the Prior Art

Pressure-sensitive adhesive resins are widely employed in a form of a film-like coating on a variety of superstrates in order to bond the latter to a normally non-adhering substrate. Another important use is in fabricating decorative laminations, such as decals. In general, pressure-sensitive resins for these applications must exhibit permanent tackiness and at the same time possess a requisite high degree of bonding capability; i.e., adhesiveness as well as cohesiveness. These properties can be built into an acrylic polymer to a large extent by the appropriate choice of constituent monomers and hence such polymeric compositions or interpolymers are preferred, especially for preparing premium quality products.

The cohesive strength of a pressure-sensitive adhesive resin represents a particularly critical property. While certain vinyl monomers inherently contribute to this property, the molecular weight of the polymer by and large is the governing factor in this regard. In practice, however, the molecular weight requirement poses problems, particularly in respect of the method conventionally observed for applying a coating of the adhesive to the superstrate. This is so because the current coating procedures require the use of an organic solution of the polymer having a manageable viscosity at a reasonably high solids content. Neither of the latter desiderata can be realized if the resin itself is of a molecular weight sufficiently high in order to provide the necessary cohesive strength.

The prior art has proposed several expedients for overcoming the need to apply resin solutions of impractically high viscosity. The expedient most prevalently observed at present consists of coating the superstrate with an organic solution of a reactive acrylic interpolymer of moderately high molecular weight and a cross-linking agent therefor. The applicable interpolymers are those having randomly distributed pendent carboxyl, hydroxyl, amino or acid anhyride groups as potential reactive sites. The currently preferred cross-linking agents are the chelates of a variety of metals, especially the chelates of titanium wherein the ligand moeity comprises ester groups. In a system of this type, the metal chelate and the interpolymer react in a progressive manner. Consequently, the film coating operation does not become seriously hampered at any time prior to the evaporation of the solvent.

SUMMARY OF THE INVENTION

In accordance with the present invention pressure-sensitive adhesive resins are provided based on a reactive acrylic interpolymer. The reactive interpolymer is characterized in having a plurality of pendent carboxyl groups or succinic anhydride residues randomly distributed along the polymer backbone. In forming the adhesive resin, the interpolymer, depending upon the nature of the reactive sites, is combined with either a mono 2-oxazoline or a polyfunctional 2-oxazoline. Controlled curing of the adhesive is effected under ambient temperature conditions by means of the 2-oxazoline reactively linking segments of the interpolymer through said carboxylic sites thereof.

The foremost advantage associated with the practice of this invention resides in the high degree of cohesive strength realized in curing the acrylic polymer by means of the 2-oxazoline cross-linking agent. A collateral advantage is that the cross-linking mechanism involved is not reversible. Hence the adhesive film is essentially stable toward deterioration of its cohesive strength property upon extended ageing.

DESCRIPTION OF THE PREFERRED EMBODIMENTS

The formulation and preparation of acrylic interpolymers useful for pressure-sensitive adhesive applications is a highly developed area of reported technology and, consequently, will be only briefly discussed here. Three general types of monomers are conventionally used to prepare the interpolymers. One type incorporates internal plasticization by contributing to a large free volume in the copolymer. These vinyl compounds further serve to enhance segmetal mobility thereby increasing the wetting ability of the resultant polymerization product. Thus, tack and adhesion properties of the interpolymer are mainly attributable to this type of monomer. Representative of the latter monomers are the esters of acrylic or methycrylic acid, containing from about 4 to 18 carbon atoms in the alkoxy moeity. Generally, the preferred carbon atom content of the alkoxy moeity is from 4–12. A particularly exemplary monomer of this type is 2-ethylhexylacrylate. These tack and adhesion contributing monomers can constitute the bulk of the monomers for preparing applicable interpolymers. However, the use of at least 40% by weight and, more preferably, about 60% of such monomers is more aligned with conventional formulation practices.

Another type of monomer conventionally used in preparing acrylic interpolymers impart a substantial degree of cohesive strength property by stiffening the molecular chains. Representative of such monomers include the vinyl esters of $C_3$–$C_{10}$ alkanoic acids, ethyl and methyl esters of acrylic and methacrylic acids, acrylonitrile, styrene, vinyl chloride and the like. Vinyl acetate, the methyl or ethyl esters of the indicated acids, as well as combinations thereof, represent the preferred monomers for this optional component of the interpolymer makeup.

A third type of monomer which is a requisite component of the interpolymers contemplated herein but employed in a relatively minor amount, includes those ethylencally unsaturated compounds having a free carboxyl or acid anhydride group. These monomers provide interpolymers containing the pendent functional groups as indicated. Such interpolymers are accordingly capable of cross-linking through the medium of an applicable 2-oxazoline to provide a cured product having requisite cohesive strength. Representative of this type of monomer include acrylic acid, methacrylic acid, maleic acid, maleic anhydride, crotonic acid, citraconic acid, the alkyl monoester of maleic acid, fumaric acid, itaconic acid and citraconic acid. The carboxyl or acid anhydride group bearing monomer is employed in the amount of from 0.5–10% based on the combined weight of the monomers used in preparing the interpolymer.

The cross-linking agents useful in the practice of this invention include both the mono and polyfunctional 2-oxazolines. The mono-oxazolines are essentially limited for use in curing acrylic interpolymers wherein the reactive sites are in the form of acid anhydride groups. Of the polyfunctional compounds, the bis 2-oxazolines are preferred. The applicable 2-oxazoline compounds are prepared by reacting ethanolamine with an appropriate carboxylic ester or a nitrile followed by condensably cyclizing the resultant intermediate. The amount of 2-oxazoline cross-linking agents useful for curing the contemplated acrylic interpolymers is from about 0.1 to 10% by weight based on the interpolymer.

An enumeration of representative multifunctional oxazoline compounds, particularly the bis-oxazolines, is as follows: 4,4', 5,5'-tetrahydro -2,2'-bisoxazole; a 2,2'-(alkanediyl) bis [4,5-dihydrooxazole], e.g., 2,2'-(1,4-butanediyl) bis [4,5-dihydrooxazole]; and 2,2'-(1-methyl-1,3-propanediyl) bis (4,5-dihydrooxazole); a 2,2'-(arylene) bis [4,5-dihydrooxazole], e.g., 2,2'-(1,4-phenylene) bis [4,5-dihydrooxazole], 2,2'(1,5-naphthalenyl) bis [4,5-dihydrooxazole] and 2,2'-(1,8-anthracenyl) bis [4,5-dihydrooxazole]; and alkylene bis 2-(arylene) [4,5-dihydrooxazole], e.g., methylene bis 2-(1,4-phenylene) [4,5-dihydrooxazole]; a 2,2',2"-(arylene) tris [4,5-dihydrooxazole], e.g., 2,2',2"-(1,3,5-phenylene) tris[4,5-dihydrooxazole]; oligomeric materials with pendent oxazoline groups such as poly [2-(alkenyl) 4,5-hydrooxazole], e.g., poly [2-(2-propenyl) 4,5-dihydrooxazole].

The following working example is given for the purpose of illustrating the invention and presenting the best mode contemplated for carrying out same. All parts and percentages noted are by weight unless otherwise indicated.

EXAMPLE

A feed solution of monomers was made consisting of 105.6 parts butyl acrylate, 23.8 parts butyl methacrylate and 10 parts methacrylic acid. A free radical initiator solution of 10.4 parts toluene, 3 parts acetone and 0.41 part of t-butylperoctoate was similarly obtained.

To a suitably equipped resin reactor was charged 10 parts of toluene, 9 parts of the monomer feed solution and 1 part of the initiator solution. The reaction mixture was kept under a nitrogen blanket and with agitation was heated to about 115° C. The remainder of the monomer and initiator mixture was combined and introduced to the reactor continuously over a period of about 1 hour. The reaction temperature meanwhile was maintained at reflux between about 100° and 115° C. At the completion of the monomer feed, a charge of 0.25 part of t-butylperoctoate in 3.5 parts of toluene was added to effect substantially complete reaction of the monomers introduced into the reaction sphere. The highly viscous polymer solution was further diluted by the addition of about 160 parts of toluene.

The above polymer was denoted test polymer A. In a similar manner other polymers of differing composition were prepared. The compositions of the latter together with that of polymer A are outlined in the following Table I:

TABLE I

| TEST POLYMER | BUTYL ACRYLATE | BUTYL METH-ACRYLATE | METH-ACRYLIC ACID | MALEIC ANHYDRIDE | TOLUENE |
|---|---|---|---|---|---|
| A | 75.8 | 17.1 | 7.2 | 0 | 180 |
| B | 79.2 | 17.8 | 0 | 3 | 165 |
| C | 80.8 | 18.2 | 0 | 1 | 20 |
| D | 77.4 | 17.4 | 3.7 | 1.5 | 170 |

Test samples of a pressure-sensitive adhesive composition were prepared from the interpolymers of Table I illustrating the use of two representative bis 2-oxazolines as the cross-linking agent. The test adhesives were cast onto a 2 mil Mylar polyester film (DuPont) to provide a solid resin coating of about 1 mil nominal thickness. After cooling, the coated films were dryed at 25° C. for 15 minutes followed by ovencuring at about 120° C. for four minutes. The cured films were provided with a silicon release paper backing and cut in 1" strips.

Adhesiveness was evaluated in accordance with the PSTC-1 peel strength test in which the individual 1" strips were applied to stainless steel test panels (ASTM 1000-65) with a standard PSTC roller. Pursuant to this test peel strength was determined on an Instrom test machine at a pull rate of 12" per minute at an angle of 180°.

Cohesiveness was evaluated in accordance with the PSTC-7 shear strength test in which a 0.5" by 0.5" section of the adhesive film and a stainless steel panel were laminated by applying pressure to the film with a PSTC roller. After a dwell time of 15 minutes under standard conditions a 500 gram weight is suspended from the test film and the time recorded for the weight to fall. Further details concerning the composition of the respective test adhesives together with the results observed in carrying out the above described test procedures are outlined in the following Table II:

TABLE II

| TEST POLYMER | 2-OXAZOLINE (Wt %)* | FILM THICKNESS (MILS) | PSTC-1 (180°) (OZ/IN) | PSTC-7 (500 g.) (HRS) |
|---|---|---|---|---|
| A | 5$^{(1)}$ | 1.0 | 24 A/CF | 51 |
| A | 5$^{(2)}$ | 1.0 | 27 CF | 54 |
| B | 4.5$^{(1)}$ | 0.8 | 13 AF | 300(N.S.) |
| B | 3.2$^{(1)}$ | 1.0 | 18 AF | 47 |
| C | 1$^{(1)}$ | 1.0 | 43 CF | 2 |
| C | 2$^{(1)}$ | 1.0 | 30 A/CF | 18 |
| C | 1$^{(1)}$ | 1.0 | 58 CF | 0.2 |
| D | 5.5$^{(1)}$ | 0.8 | 12 AF | 300(N.S.) |
| D | 2$^{(1)}$ | 0.7 | 14 AF | 300(N.S.) |

*Based on solids content of test polymer
$^{(1)}$2,2'-(1,4-butane diyl) bis [4,5-di hydrooxazole]
$^{(2)}$2,2'-(1-methyl-1,3-propane diyl) bis [4,5-di hydrooxazole]
AF = adhesive failure
CF = cohesive failure
N.S. = no slipping

What is claimed is:
1. A pressure sensitive adhesive composition comprising the reaction product of: (1) a normally tacky interpolymer derived by the addition polymerization of 100 parts by weight of a monomer mixture consisting essentially of (a) at least 40 parts of a $C_4$–$C_{18}$ alkyl acrylate or methacrylate; (b) from 0.5–10 parts of an ethylenically unsaturated monomer having at least one carboxyllic acid group; (c) the balance including (i) a $C_3$–$C_{10}$ vinyl ester of an alkanoic acid, and/or (ii) a methyl or ethyl ester of acrylic acid or methacrylic acid;

(2) from 0.1-10% by weight based on (1) of a 2-oxazoline.

2. A pressure sensitive adhesive composition comprising the reaction product of:

(1) a normally tacky interpolymer derived by the addition polymerization of 100 parts by weight of a monomer mixture consisting essentially of (1) at least 60 parts of a $C_4$-$C_{18}$ alkyl acrylate or methacrylate; (b) from 0.5-10 parts of an ethylenically unsaturated monomer having at least one carboxylic acid group; (c) the balance including (i) a $C_3$-$C_{10}$ vinyl ester of an alkanoic acid, and/or (ii) a methyl or ethyl ester of acrylic acid or methacrylic acid;

(2) from 0.1-10% by weight based on (1) of a 2-oxazoline.

3. The composition according to claim 2 wherein 2-oxazoline is a polyfunctional 2-oxazoline.

4. The composition in accordance with claim 3 wherein said polyfunctional oxazoline is a bis 2-oxazoline.

5. The composition in accordance with claim 4 wherein said bis 2-oxazoline is 2,2'-(1,4-butanediyl) bis [4,5-dihydrooxazole].

6. The composition according to claim 4 wherein said bis 2-oxazoline is 2,2'-(1-methyl-1,3-propanediyl) bis [4,5-dihydrooxazole].

* * * * *